United States Patent
Chiu et al.

(10) Patent No.: US 8,302,027 B2
(45) Date of Patent: Oct. 30, 2012

(54) GRAPHIC USER INTERFACE MANAGEMENT SYSTEM AND METHOD

(75) Inventors: Kai-Feng Chiu, Taoyuan (TW); Shih-Yun Yang, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 503 days.

(21) Appl. No.: 12/641,592

(22) Filed: Dec. 18, 2009

(65) Prior Publication Data

US 2011/0107269 A1 May 5, 2011

(30) Foreign Application Priority Data

Oct. 29, 2009 (CN) .......................... 2009 1 0309067

(51) Int. Cl.
*G06F 3/048* (2006.01)

(52) U.S. Cl. ........ 715/789; 715/745; 715/769; 715/782; 715/811; 715/835; 715/836; 715/847; 715/848; 715/849; 715/850; 715/851; 715/852; 345/419; 345/619; 345/672; 345/902

(58) Field of Classification Search .................. 345/419, 345/672, 902; 715/745, 769, 789, 782, 811, 715/835, 836, 847–852

See application file for complete search history.

(56) References Cited

U.S. PATENT DOCUMENTS

| | | | | |
|---|---|---|---|---|
| 5,678,015 | A * | 10/1997 | Goh | 715/782 |
| 7,107,549 | B2 * | 9/2006 | Deaton et al. | 715/836 |
| 7,134,095 | B1 * | 11/2006 | Smith et al. | 715/860 |
| 7,761,810 | B2 * | 7/2010 | Shim et al. | 715/827 |
| 2001/0028369 | A1 * | 10/2001 | Gallo et al. | 345/848 |
| 2003/0142136 | A1 * | 7/2003 | Carter et al. | 345/782 |
| 2004/0085328 | A1 * | 5/2004 | Maruyama et al. | 345/619 |
| 2008/0059893 | A1 * | 3/2008 | Byrne et al. | 715/757 |
| 2008/0256468 | A1 * | 10/2008 | Peters et al. | 715/764 |
| 2009/0089692 | A1 * | 4/2009 | Morris | 715/764 |
| 2009/0113033 | A1 * | 4/2009 | Long et al. | 709/223 |
| 2009/0125801 | A1 * | 5/2009 | Algreatly | 715/234 |
| 2009/0228824 | A1 * | 9/2009 | Forstall et al. | 715/779 |
| 2010/0050129 | A1 * | 2/2010 | Li et al. | 715/849 |
| 2010/0169836 | A1 * | 7/2010 | Stallings et al. | 715/848 |
| 2011/0212717 | A1 * | 9/2011 | Rhoads et al. | 455/420 |

\* cited by examiner

*Primary Examiner* — Xiao M. Wu
*Assistant Examiner* — Todd Buttram
(74) *Attorney, Agent, or Firm* — Altis Law Group, Inc.

(57) ABSTRACT

A graphic user interface management system displays all shortcuts on surfaces of a first three-dimensional (3D) graph displayed on a desktop background. The first 3D graph streams objects during rotating. On projection paths of the objects, a first preset number of objects forms system time to be displayed on the desktop background, a second preset number of objects forms a process wall, which displays running processes of shortcuts invoked by a user from the first 3D graph. The shortcuts dragged from the first 3D graph to other positions of the desktop background are represented by second 3D graphs. A rotation speed and direction of the first 3D graph change according to an operation speed and direction on the first 3D. The system further performs corresponding desktop display actions according to manipulated operations on the first 3D graph, the process wall, or the second 3D graphs.

18 Claims, 11 Drawing Sheets

GRAPHIC USER INTERFACE MANAGEMENT SYSTEM AND METHOD

BACKGROUND

1. Technical Field

Embodiments of the present disclosure relates to user interface management systems and methods, and more particularly, to a graphic user interface (GUI) management system and method implemented in an electronic device.

2. Description of Related Art

Presently, graphic user interface (GUI) systems of electronic devices, such as computers, mobile phones, often displays static and two-dimensional icons of applications. The icons provided by the (GUI) systems cannot dynamically and flexibly alter according to types of the electronic devices and user's operations.

What is needed, therefore, is an improved system and method to overcome the aforementioned problem.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

As used herein, the term "process wall" is a manager used to manage running applications. As used herein, the term "first 3D graph" is a container, which collects all shortcuts of applications, displayed on a user interface of an electronic device. As used herein, the term "second 3D graph" represents a shortcut dragged from the "first 3D graph" to other positions of the user interface.

Figure 1:
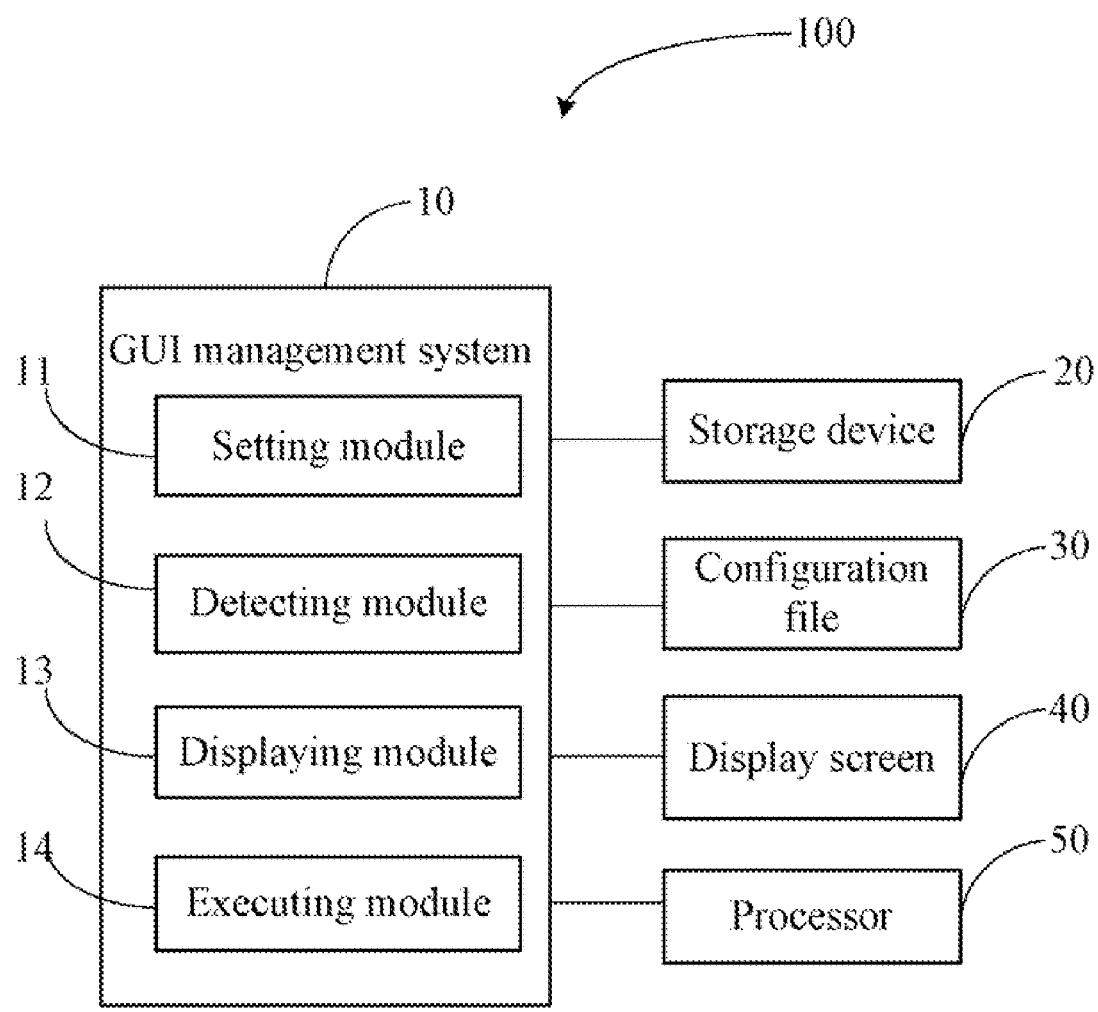
FIG. 1 is a block diagram of one embodiment of an electronic device comprising a desktop management system.

FIG. 1 is a block diagram of one embodiment of an electronic device 100 comprising a graphic user interface (GUI) management system 10. The graphic user interface (GUI) management system 10 may be used to provide and display dynamic three-dimensional (3D) desktop icons, according to configuration information of the electronic device 100 and manipulated operations from a user. A display screen 40 displays the dynamic 3D desktop icons to users. The display screen 40 may be a touch screen, for example. The manipulated operations may include a user using a pointing device, such as a mouse, trackball, or a keyboard, or a touch screen (using a stylus and/or one or more fingers), for example.

In one embodiment, configuration information of the electronic device 100 may be stored in a configuration file 30, and include a size and a resolution of the display screen 40. Depending on the embodiment, the electronic device 100 may be a computer, a mobile phone, or a digital assistant, for example. The desktop icons may be application shortcuts of function menus, images, video/audio files, text files, and any other application.

In one embodiment, the GUI management system 10 includes a setting module 11, a detecting module 12, a display module 13, and an executing module 14. One or more computerized codes of the modules 11-14 are stored in a storage device 20 of the electronic device 100, where a processor 50 executes the computerized codes, to provide one or more operations of the GUI management system 10.

The setting module 11 receives desktop display parameters set by a user, and stores the desktop display parameters into the storage device 20. In one embodiment, the desktop display parameters include a desktop background, display parameters of a first 3D graph for carrying all desktop icons, display parameters of a process wall for displaying running processes of desktop icons invoked by the user, display parameters of a second 3D graph, which represents each desktop icon dragged from the first 3D graph to other positions of the desktop background, and display parameters of system time. The user can select a favorite picture stored in the storage device 20 as the desktop background, such as a black image.

Figure 4:
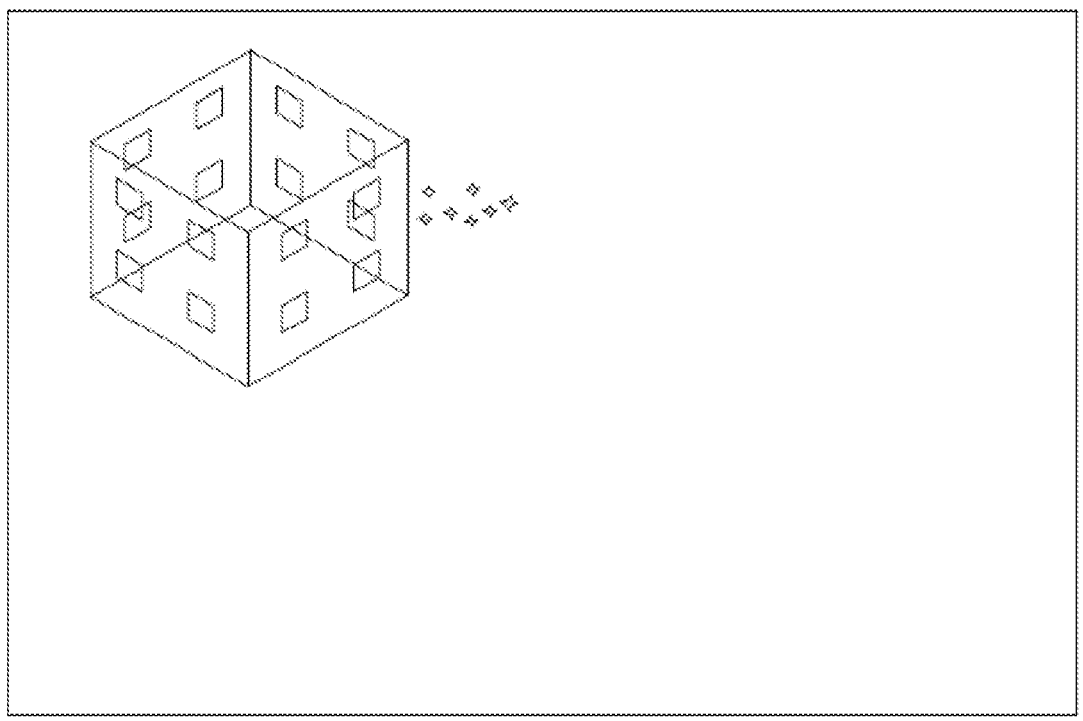
FIG. 4-FIG. 10 are examples of dynamically displaying desktop icons.

In one embodiment, the display parameters of the first 3D graph include a shape, a size, and a color. For example, as shown in FIG. 4, the first 3D graph may be a cube. The size of the cube may be set as ¹⁄₁₂ of the size of the display screen 40. The cube may have transparent upper and lower surfaces, and colors of other four side surfaces may be set as yellow, green, blue, and purple, or any other color. Desktop shortcuts of applications, such as function menus, images, video/audio files, and text files, are displayed on the four side surfaces of the cube.

The display parameters of the first 3D graph further include a display position of the first 3D graph on the desktop background, an initial rotation speed and an initial rotation direction of the first 3D graph. In one embodiment, the display position of the first 3D graph may be set as ¹⁄₂₀*d1 far from the upper boundary of the desktop background, and ¹⁄₂₀*d2 far from the left boundary of the desktop background, where d1=a length of a longer side of the display screen 40, and d2=a length of a shorter side of the display screen 40. The initial rotation direction of the first 3D graph may be set as clockwise, and the initial rotation speed may be set as 3 centimeters per second (cm/s), for example.

Figure 5:
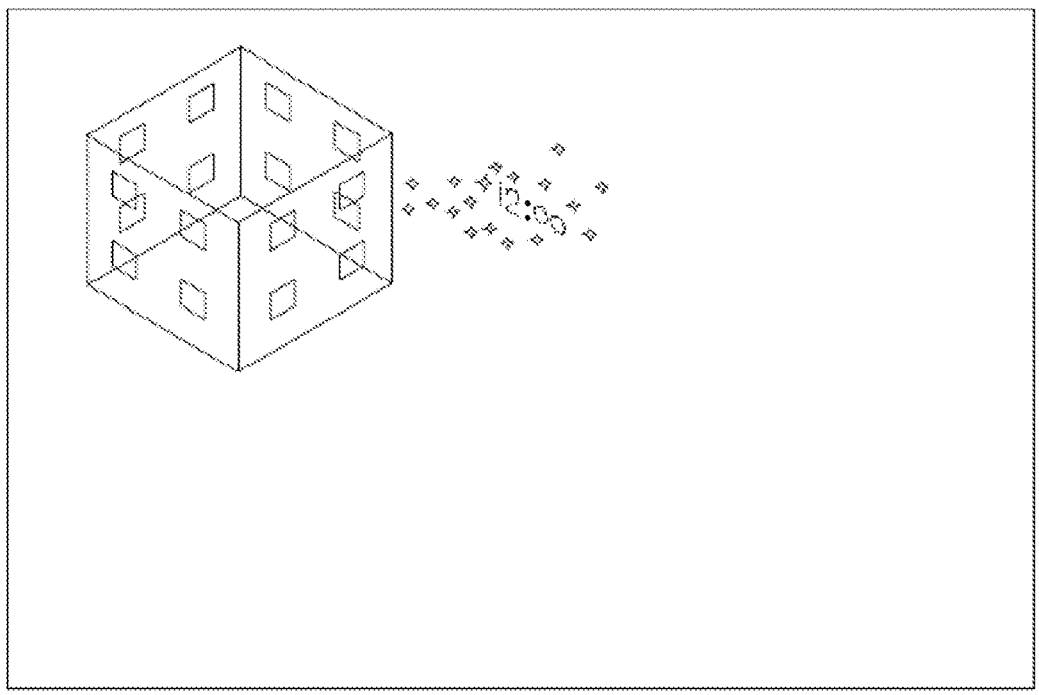

Furthermore, the display parameters of the first 3D graph may include various animation parameters of an one or more objects being animated. In one example, the objects may include a stream of objects (e.g., confetti), and the animation parameters may include an initial speed of the objects (e.g., confetti) during rotation of the first 3D graph. The animation parameters may further include one or more colors of the objects, projection paths of the objects, and associations between a rotation speed of the first 3D graph and a stream speed of the objects. For example, the initial speed of the objects may be five objects per second. The color of the objects may be white or any other color. The objects may be sparkling spots or with any other shape (as shown in FIG. 5).

The projection paths of the objects may be a plurality of paracurves. The stream speed of the objects may be in direct proportion to the rotation speed of the first 3D graph. The rotation speed of the first 3D graph may be in direct proportion to a manipulated operation speed on the first 3D graph, where the operations may be manipulated by a user touching the display screen 40.

In one embodiment, the display parameters of the process wall (e.g., the parallelogram shown in FIG. 6) include a size and a display position of the process wall on the desktop background. The size and the display position of the process wall may be set referring to above described setting of the first 3D graph.

Figure 6:
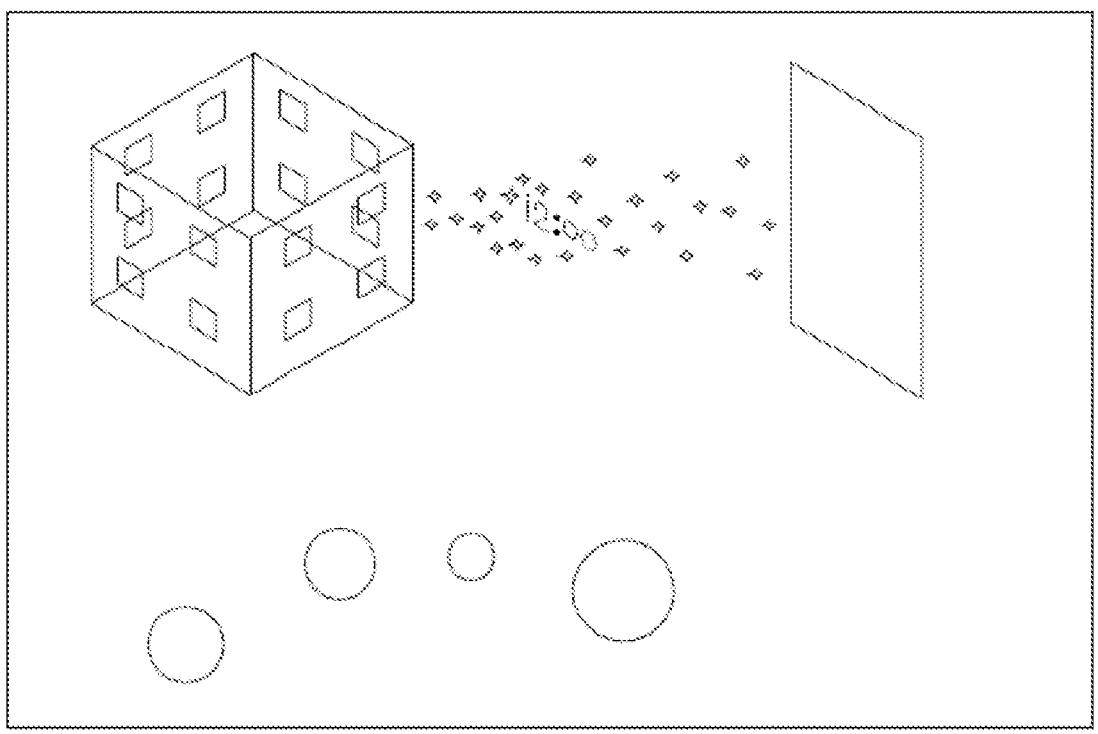

In one embodiment, the display parameters of the second 3D graph includes a shape, an initial size, and a color. For example, the second 3D graph may be a sphere (as shown in FIG. 6) having a radius of 0.8 cm. The color may be any color. The display parameters of the second 3D graph may further include an association between the size of the 3D graph and a usage frequency of the second 3D graph. For example, the radius of the sphere may be set to increase by 0.05 cm every time the desktop shortcut represented by the sphere is invoked by the user. The radius of the sphere may be set to decrease 0.05 cm, if the desktop shortcut represented by the sphere has not been invoked within a duration (e.g., 24 h). The user may also set a zoom in icon and a zoom out icon for the 3D graph, so that when a user's finger or a cursor stays on the 3D graph, the user can freely zoom in or zoom out the 3D graph.

In one embodiment, the display parameters of the system time may include a display position of the system time on the desktop background. The display position of the system time may be set referring to above described setting of the first 3D graph.

The setting module 11 further receives associations between desktop display actions and manipulated operations on the first 3D graph, the process wall, or the second 3D graph (detailed description is given in FIG. 3) set by the user. As mentioned above, the operations may be manipulated by the user touching the display screen 40. For example, the user may set a pause of the user's finger on the first 3D graph beyond a first time period (e.g., 10 s) corresponding to an operation of stopping rotation of the first 3D graph, and a re-touching of the user's finger on the first 3D graph corresponding to a restarting rotation of the 3D graph.

The detecting module 12 determines a type of the electronic device 100 according to the configuration information recorded in the configuration file 30, and determines desktop shortcuts to be displayed on the first 3D graph according to the type of the electronic device 100. For example, if the configuration information includes information of a subscriber identity module (SIM) card, the detecting module 12 determines the electronic device 100 may be a mobile phone (or a device has similar function of a mobile phone), and the desktop shortcuts to be displayed on the first 3D graph include "phonebook," "call history," which are related to the mobile phone. If the configuration information does not include SIM information, the detecting module 12 determines the electronic device 100 may be a computer, and the desktop shortcuts, such as "phonebook," "call history," which are related to mobile phones are not necessary to be displayed on the first 3D graph.

The display module 13 draws and displays the first 3D graph on the desktop background according to the display parameters of the first 3D graph. For example, the display position of the cube in FIG. 4 is determined in preset proportion to the size of the display screen 40. As shown in FIG. 4, the cube displays all desktop shortcuts on its side surfaces, clockwise rotates with the preset initial rotation speed of 3 cm/s, and continuously streams the sparkling spots with the preset initial stream speed of 15 sparkling spots per second during the clockwise rotation.

The detecting module 12 further detects a current system time of the electronic device from a clock chip (not shown in FIG. 1) of the electronic device 100. The display module 13 collects a first preset number of objects to form the current system time, and displays the current system in a corresponding position of the desktop background. For example, as shown in FIG. 5, the display module 13 collects 40 objects to display the current system time 12:00 at a position, which may be $\frac{1}{12}*d1$ far from the upper boundary of the desktop background, and $\frac{1}{2}*d2$ far from the left boundary of the desktop background, where d1=the length of the longer side of the display screen 40, and d2=the length of the shorter side of the display screen 40.

The executing module 14 performs corresponding desktop display actions according to the manipulated operations on the first 3D graph, adjusts a rotation speed of the first 3D graph according to an operation speed of the user on the first 3D graph, and adjusts a stream speed of the objects according to the rotation speed of the 3D graph. In this embodiment, according to preset associations between the manipulated operation speed, the rotation speed of the first 3D graph, and the stream speed of the objects (described in paragraph [0016]), the quicker the manipulated operation speed on the first 3D graph, the quicker the rotation speed of the first 3D graph and the stream speed of the objects.

Figure 7:
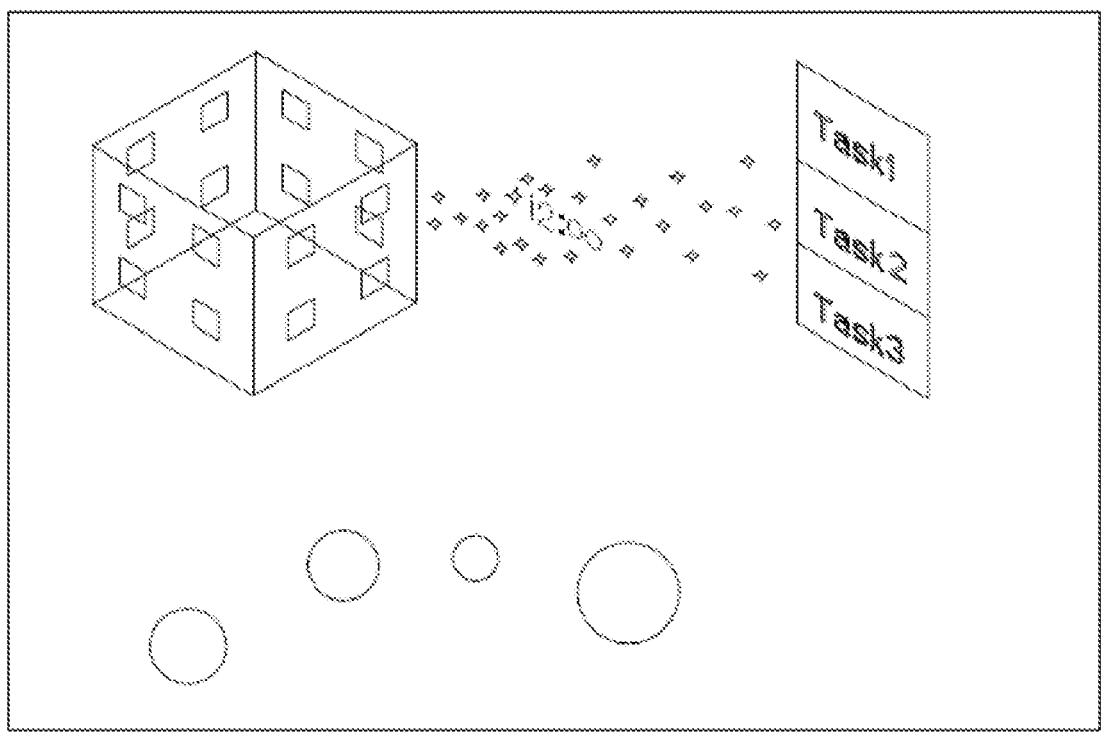

The display module 13 further collects a second preset number of objects to create the process wall according to the display parameters of the process wall (as shown in FIG. 6), and displays running processes of the desktop shortcuts, which are invoked by the user from the first 3D graph, on the process wall. For example, as shown in FIG. 7, there are three running processes "Task 1," "Task 2," and "Task 3" of three desktop shortcuts, such as an image, a text file, and a dictionary, displayed on the process wall.

Figure 8:
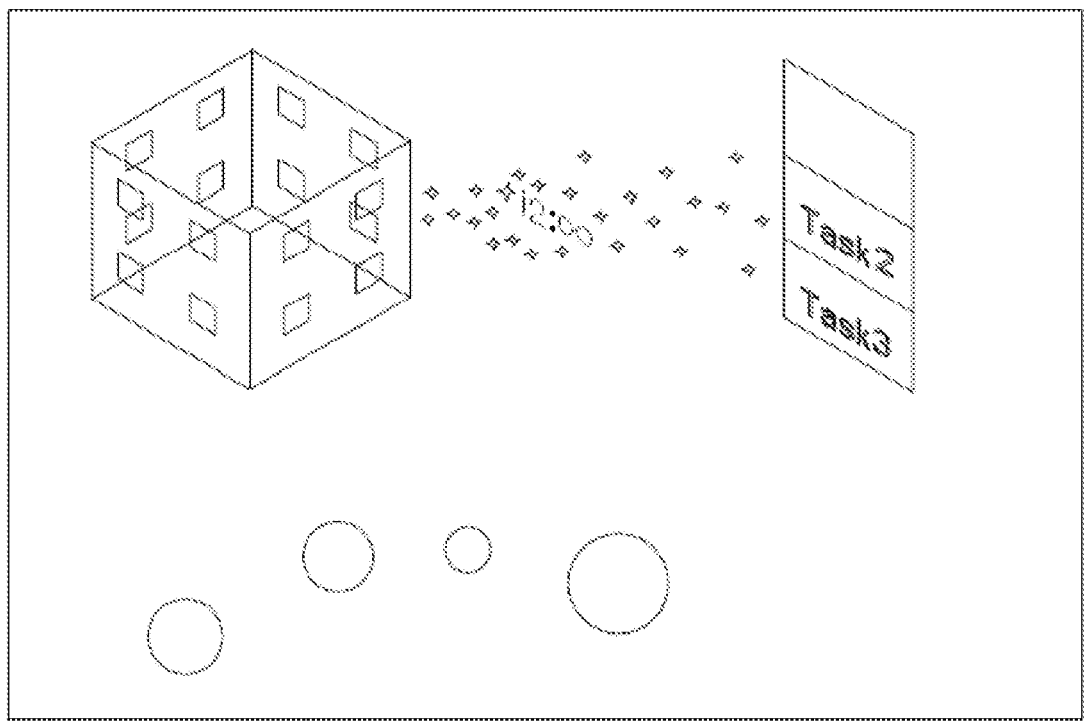

The executing module 14 further generates a second 3D graph on a corresponding position of the desktop background according to the third display parameters, so as to represent a desktop shortcut dragged from the first 3D graph by the second 3D graph. For example, if four desktop shortcuts "Messages," "Phonebook," "Settings," and "Tools" are dragged from the rotating cube to other positions of the desktop background, the executing module 14 represents each of the four desktop shortcuts by a sphere having an initial radius of 0.8 cm on a corresponding position of the desktop background. The higher the usage frequency of a sphere, the bigger the sphere (as shown in FIG. 6 to FIG. 8).

Figure 9:

The executing module 14 further performs corresponding desktop display actions according to user's operations on the process wall or the second 3D graph. For one example, if a running process (e.g., Task 1) displayed on the process wall is dragged to other positions of the desktop background, the executing module 14 enlarges the running process and displays the enlarged running process on the desktop background (as shown in FIG. 8 and FIG. 9). For another example, if a second 3D graph (e.g., a sphere), which represents a desktop shortcut, displayed on the desktop background is dragged to margins of the desktop background, the executing module 14 deletes the second 3D graph (e.g., the sphere) from the desktop background.

Figure 2A:
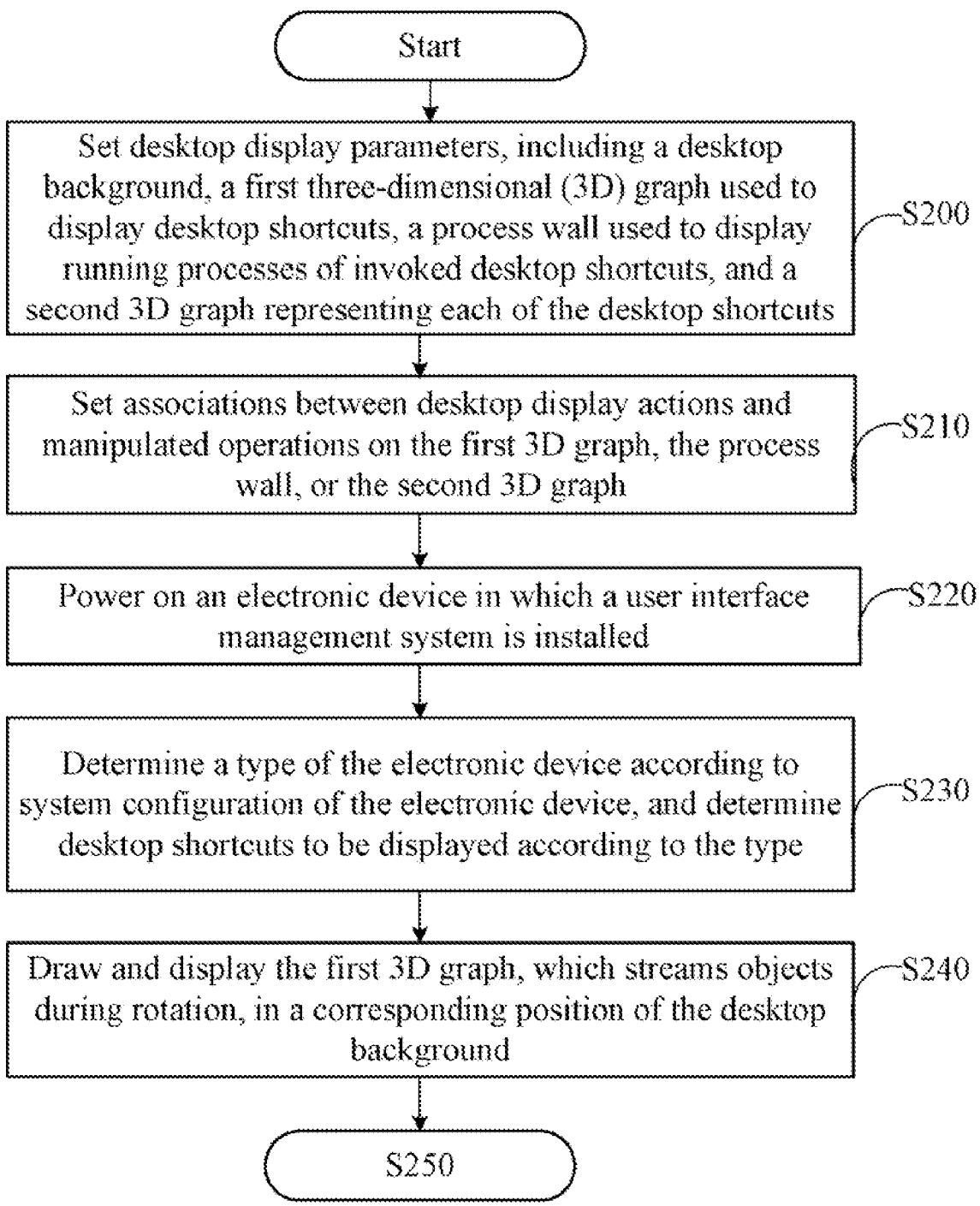
FIG. 2A and FIG. 2B is a flowchart of one embodiment of a desktop management method implemented in the electronic device of FIG. 1.
Figure 2B:
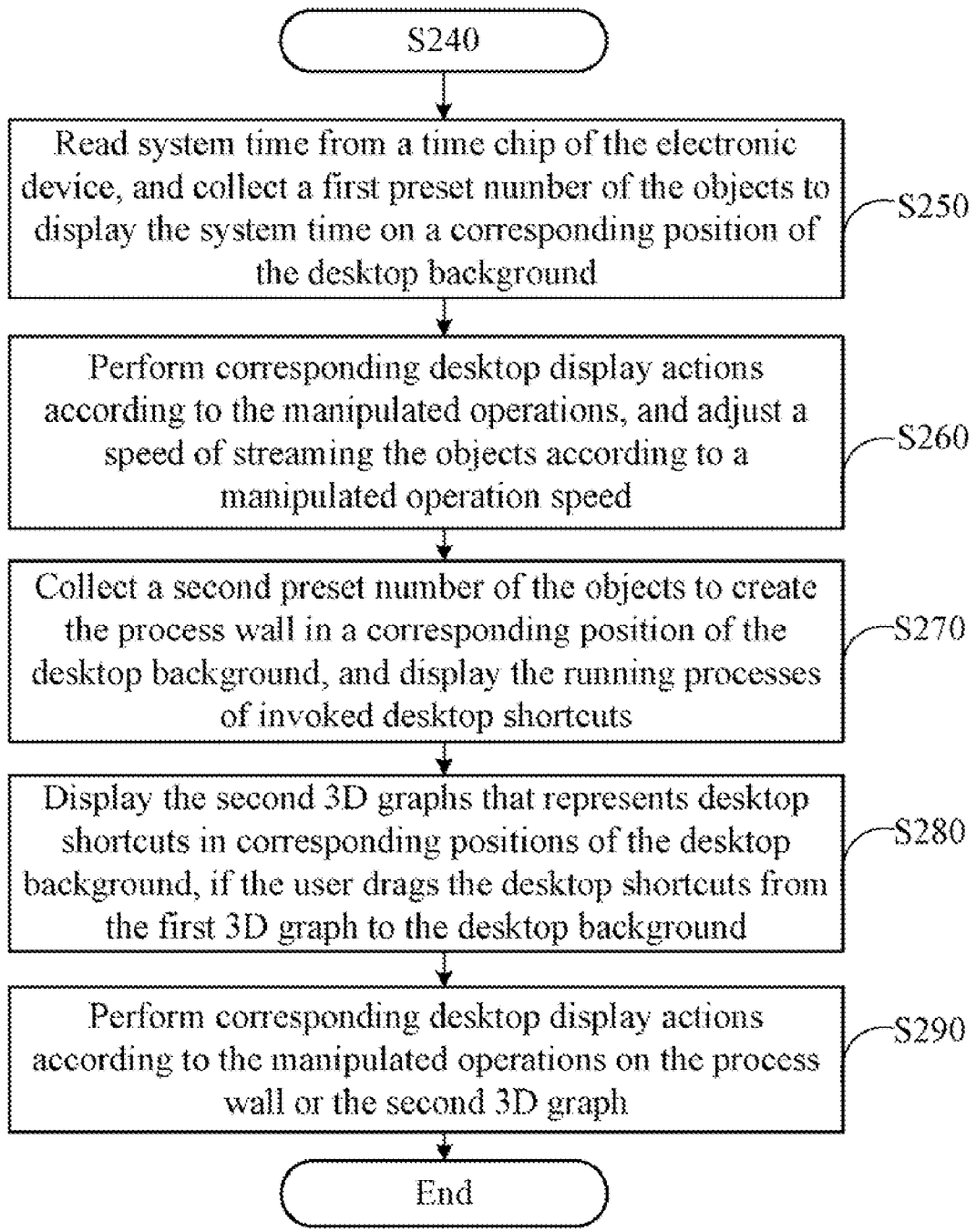

FIG. 2 is a flowchart of one embodiment of a desktop management method. Depending on the embodiment, additional blocks may be added, others removed, and the ordering of the blocks may be changed.

In block S200, the setting module 11 receives desktop display parameters set by a user, and stores the desktop display parameters into the storage device 20. In one embodiment, the desktop display parameters include a desktop background, display parameters of a first 3D graph for carrying desktop shortcuts, display parameters of a process wall for displaying running processes of desktop shortcuts invoked by the user, display parameters of a second 3D graph representing each desktop shortcut, and display parameters of system time. A detailed description of the desktop display parameters can refer to aforementioned function descriptions of the setting module 11.

In block S210, the setting module 11 further receives associations between desktop display actions and the manipulated operations on the first 3D graph, the process wall, or the second 3D graph set by the user (A detailed description will be given in FIG. 3). As mentioned above, the operations may be manipulated by the user touching the display screen 40.

In block S220, the electronic device 100 is powered on.

In block S230, the detecting module 12 determines a type of the electronic device 100 according to the configuration information recorded in the configuration file 30, and determines desktop shortcuts to be displayed on the first 3D graph according to the type of the electronic device 100. For example, if the configuration information includes information of a subscriber identity module (SIM) card, the detecting module 12 determines the electronic device 100 may be a mobile phone (or a device has similar function of a mobile phone), and the desktop shortcuts to be displayed on the first 3D graph may include "phonebook," "call history," which are related to the mobile phone.

In block S240, the display module 13 draws and displays the first 3D graph on the desktop background according to the display parameters of the first 3D graph (examples can refer to FIG. 4 and paragraph [0019]).

In block S250, the detecting module 12 further detects a current system time of the electronic device from a clock chip (not shown in FIG. 1) of the electronic device 100. The display module 13 collects a first preset number of objects to form the current system time, and displays the current system in a corresponding position of the desktop background (examples can refer to FIG. 5 and paragraph [0023]).

Figure 10:
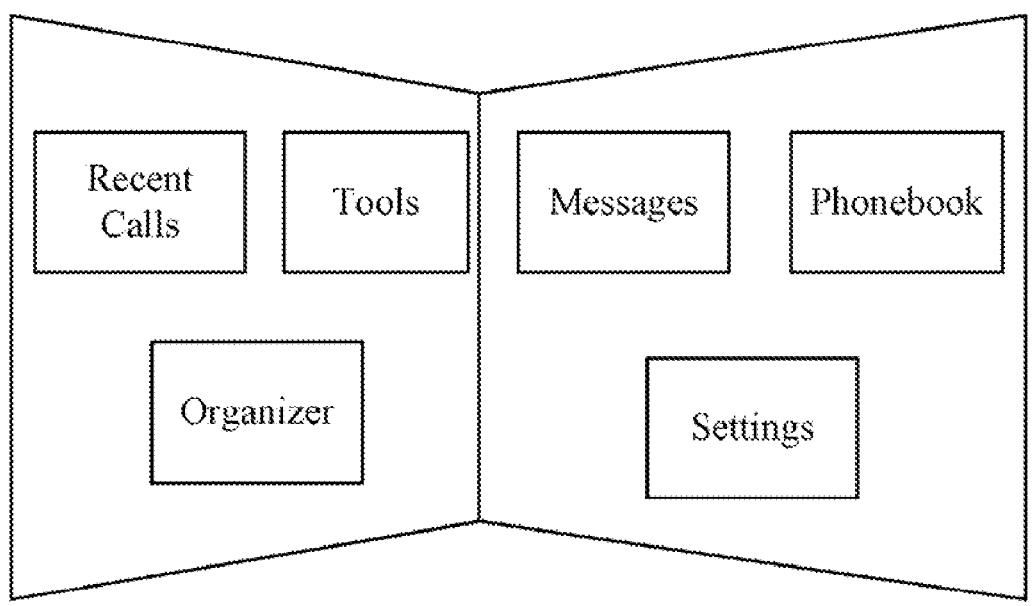

In block S260, the executing module 14 performs corresponding desktop display actions according to the manipulated operations on the first 3D graph, adjusts a rotation speed of the first 3D graph according to an operation speed of the user to the first 3D graph, and adjusts a stream speed of the objects according to the rotation speed of the 3D graph. For example, if the user's finger clicks on a black area of the cube, the executing module 14 may unfold all surfaces of the cube on the desktop background (as shown in FIG. 10). If the rotation speed of the first 3D graph is set to be in direct proportion to a manipulated operation speed on the first 3D graph, the quicker the manipulated operation speed of the user to the first 3D graph, the quicker the rotation speed of the first 3D graph.

In block S270, the display module 13 further collects a second preset number of objects to create the process wall according to the display parameters of the process wall (as shown in FIG. 6), and displays running processes of the desktop shortcuts, which are invoked by the user from the first 3D graph, on the process wall (as shown in FIG. 7).

In block S280, the executing module 14 generates a second 3D graph on a corresponding position of the desktop background according to the third display parameters, so as to represent a desktop shortcut dragged from the first 3D graph by the second 3D graph. For example, if the user drags a desktop shortcut of "Messages" from the rotating cube to the desktop background, the executing module 14 represents the desktop shortcut of "Messages" by a sphere having an initial radius of 0.8 cm on a corresponding position of the desktop background. The higher usage frequency of the sphere representing the desktop shortcut of "Messages," the bigger the sphere (as shown in FIG. 6 to FIG. 8).

In block S290, the executing module 14 performs corresponding desktop display actions according to the manipulated operations on the process wall or the second 3D graph. For one example, if a running process (e.g., Task 1) displayed on the process wall is dragged to other position on the desktop background, the executing module 14 enlarges the running process and displays the enlarged running process on the desktop background (as shown in FIG. 8 and FIG. 9). For another example, if the sphere representing the desktop shortcut of "Messages" is dragged to margins of the desktop background, the executing module 14 deletes the sphere representing the desktop shortcut of "Messages."

Figure 3:
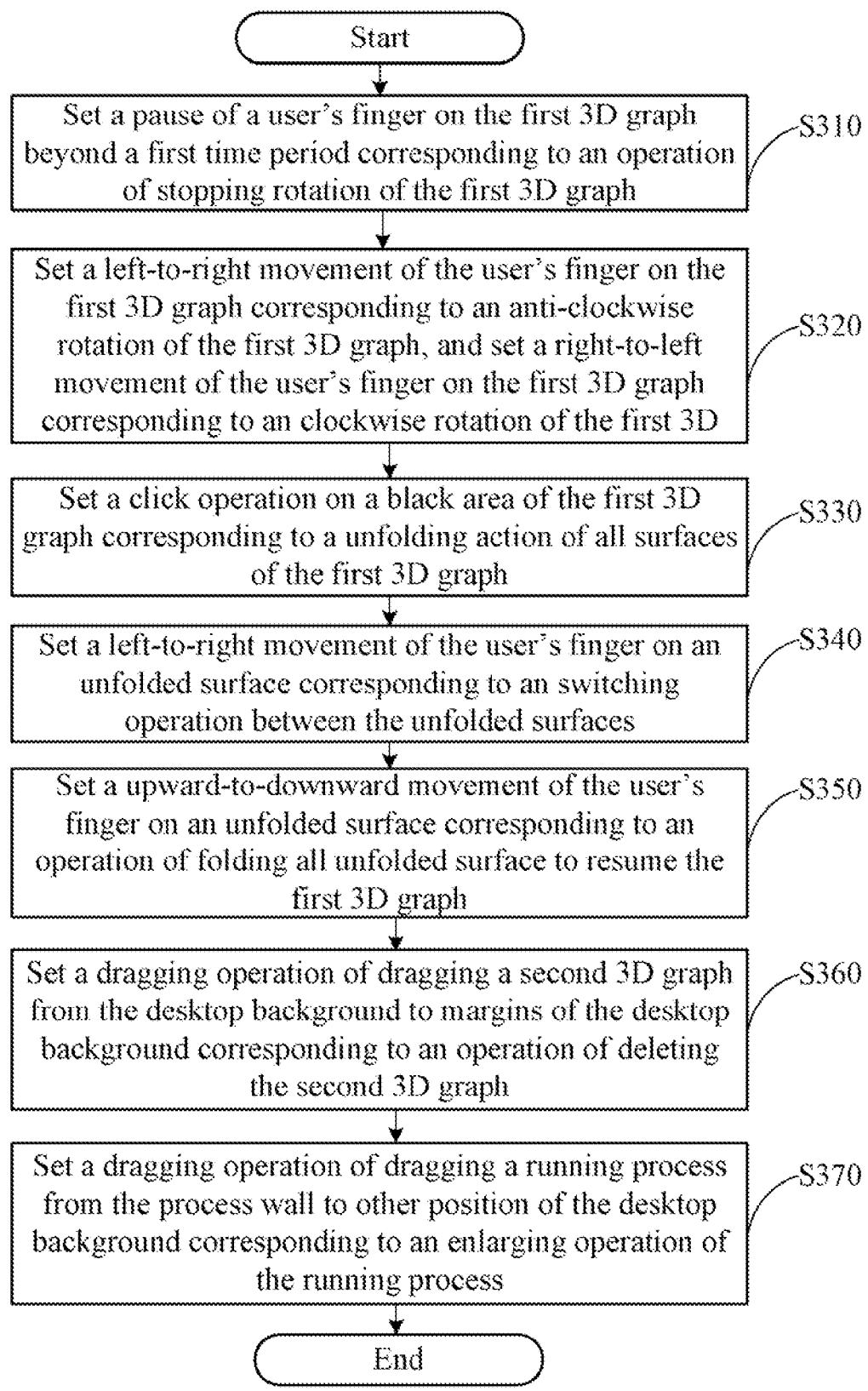
FIG. 3 is a detailed description of one block in FIG. 2.

FIG. 3 is a detailed description of block S210 in FIG. 2. Depending on the embodiment, additional blocks may be added, others removed, and the ordering of the blocks may be changed.

In block S310, the setting module 11 sets a pause of the user's finger on the first 3D graph beyond a first time period corresponding to an operation of stopping rotation of the first 3D graph. For example, if the user's finger stays on the cube in FIG. 4 more than 10 seconds, the cube may stop rotation. If the cube stops rotation, the cube also stops streaming objects. The setting module 11 may further set a re-touching on the first 3D graph corresponding to restarting rotation of the first 3D graph. Once rotation being restarted again, the first 3D graph restarts to stream the objects.

In block S320, the setting module 11 sets a left-to-right movement of the user's finger on the first 3D graph corresponding to an anti-clockwise rotation of the first 3D graph, and sets a right-to-left movement of the user's finger on the first 3D graph corresponding to an clockwise rotation of the first 3D graph.

In block S330, the setting module 11 sets a click operation on a black area of the first 3D graph corresponding to a unfolding action of all surfaces of the first 3D graph.

In block S340, the setting module 11 sets a left-to-right movement of the user's finger on an unfolded surface corresponding to an switching operation between the unfolded surfaces. Due to that a display range of the desktop background is limited, all unfolded surface cannot be displayed at one time. FIG. 10 shows two unfolded surfaces of the cube, the user may switch to other hidden unfolded surfaces by sliding a finger from left to right on one displayed unfolded surface.

In block S350, the setting module 11 sets an upward-to-downward movement of the user's finger on an unfolded surface corresponding to an operation of folding all unfolded surface to resume the first 3D graph. For example, if the user' finger slides from upward to downward on one displayed unfolded surface, all unfolded surface will be folded to resume the cube displayed in FIG. 4 to FIG. 8.

In block S360, the setting module 11 sets a dragging operation of dragging a second 3D graph (e.g. a sphere) from the desktop background to margins of the desktop background corresponding to an operation of deleting the second 3D graph (e.g., the sphere).

In block S370, the setting module 11 sets a dragging operation of dragging a running process (e.g., the Task 1) from the process wall to other position of the desktop background corresponding to an enlarging operation of the running process (e.g., the Task 1).

It is understood that, FIG. 3 only give some examples for setting the associations between desktop display actions and user's operations on the first 3D graph, the process wall, or the second 3D graph. Users may set the associations according to user's habits flexibly. The first 3D graph is not limited to the cube and the second 3D graph is not limited to the sphere, but may be any other suitable 3D graphs.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A graphic user interface management system applied in an electronic device, the system comprising:
   a storage device;
   at least one processor; and
   one or more programs stored in the storage device to be executed by the at least one processor, the one or more programs comprising:
   a setting module operable to set desktop parameters, and store the desktop parameters into the storage device, wherein the desktop parameters comprise a desktop background, first display parameters of a first three-dimensional (3D) graph used to display desktop shortcuts and stream objects during rotation, second display parameters of a process wall used to display running processes of invoked desktop shortcuts, and third display parameters of a second 3D graph representing each of the desktop shortcuts;
   the setting module further operable to set associations between desktop display actions and manipulated operations on the first 3D graph, the process wall, or the second 3D graph;
   a detecting module operable to determine a type of the electronic device according to the configuration information of the electronic device, and determine desktop shortcuts to be displayed on the first 3D graph according to the type of the electronic device;
   a display module operable to draw and display the first 3D graph on a first position of the desktop background displayed on a touch screen, according to the first display parameters;
   the display module further operable to form a current system time on a second position of the desktop background by collecting a first preset number of the objects streamed by the first 3D graph during rotation, create the process wall on a third position of the desktop background by collecting a second preset number of the objects streamed by the first 3D graph during rotation according to the second display parameters, and display the running processes of invoked desktop shortcuts on the process wall, wherein the third position of the process wall is independent from the first position of the first 3D graph;
   an executing module operable to generate a second 3D graph on a corresponding position of the desktop background according to the third display parameters, so as to represent a desktop shortcut dragged from the first 3D graph by the second 3D graph; and
   the executing module further operable to perform corresponding desktop display actions according to the manipulated operations on the first 3D graph, the process wall, or the second 3D graph.

2. The system as claimed in claim 1, wherein:
   the first display parameters comprise a shape, a size, a color, a display position, an initial rotation speed, an initial rotation direction, an initial speed of streaming objects during rotation, and colors of the objects;
   the second display parameters comprise a size and a display position of the process wall; and
   the third display parameters comprise a shape, an initial size, and a color of the second 3D graph.

3. The system as claimed in claim 2, wherein the first display parameters further comprise an association between a manipulated operation speed on the first 3D graph and a rotation speed of the first 3D graph, an association between the rotation speed of the first 3D graph and a stream speed of the objects, and projection paths of the objects.

4. The system as claimed in claim 3, wherein the executing module is further operable to automatically adjust the rotation speed of the first 3D graph and the stream speed of the objects according to the manipulated operation speed on the first 3D graph.

5. The system as claimed in claim 2, wherein the third display parameters further comprise an association between the size of the second 3D graph and a usage frequency of the second 3D graph.

6. The system as claimed in claim 5, wherein the executing module is further operable to automatically adjust the size of the second 3D graph according to the usage frequency of the second 3D graph.

7. The system as claimed in claim 2, wherein the detecting module is further operable to detect the current system time of the electronic device from a clock chip of the electronic device.

8. The system as claimed in claim 2, wherein the sizes of the first 3D graph and the process wall, and the display positions of the first 3D graph and the process wall are set according to preset proportions to the size of the display screen of the electronic device.

9. The system as claimed in claim 1, wherein setting the associations between desktop display actions and manipulated operations on the first 3D graph, the process wall, or the second 3D graph comprises:
   setting a pause of a user's finger on the first 3D graph beyond a first time period corresponding to an operation of stopping rotation of the first 3D graph;
   setting a left-to-right movement of the user's finger on the first 3D graph corresponding to an anti-clockwise rotation of the first 3D graph, and a right-to-left movement of the user's finger on the first 3D graph corresponding to an clockwise rotation of the first 3D graph;
   setting a click operation on a black area of the first 3D graph corresponding to a unfolding action of all surfaces of the first 3D graph, a left-to-right movement of the user's finger on an unfolded surface corresponding to an switching operation between the unfolded surfaces, and an upward-to-downward movement of the user's finger on an unfolded surface corresponding to an operation of folding all unfolded surface to resume the first 3D graph;
   setting a dragging operation of dragging a second 3D graph from the desktop background to margins of the desktop background corresponding to an operation of deleting the second 3D graph, and a dragging operation of dragging a running process from the desktop background to margins of the desktop background corresponding to an operation of closing the running process; and setting a dragging operation of dragging a running process from the process wall to other position of the desktop background corresponding to an enlarging operation of the running process.

10. A graphic user interface management method implemented in an electronic device, the method comprising:

setting desktop parameters, and storing the desktop parameters into a storage device, wherein the desktop parameters comprise a desktop background, first display parameters of a first three-dimensional (3D) graph used to display desktop shortcuts and stream objects during rotation, second display parameters of a process wall used to display running processes of invoked desktop shortcuts, and third display parameters of a second 3D graph representing each of the desktop shortcuts;

setting associations between desktop display actions and manipulated operations on the first 3D graph, the process wall, or the second 3D graph;

determining a type of the electronic device according to the configuration information of the electronic device, and determining desktop shortcuts to be displayed on the first 3D graph according to the type of the electronic device;

drawing and displaying the first 3D graph on a first position of the desktop background displayed on a touch screen of the electronic device, according to the first display parameters;

forming a current system time on a second position of the desktop background by collecting a first preset number of the objects streamed by the first 3D graph during rotation;

creating the process wall on a third position of the desktop background by collecting a second preset number of the objects streamed by the first 3D graph during rotation according to the second display parameters, and displaying the running processes of invoked desktop shortcuts on the process wall, wherein the third position of the process wall is independent from the first position of the first 3D graph;

generating a second 3D graph on a corresponding position of the desktop background according to the third display parameters, so as to represent a desktop shortcut dragged from the first 3D graph by the second 3D graph; and performing corresponding desktop display actions according to the manipulated operations on the first 3D graph, the process wall, or the second 3D graph.

11. The method as claimed in claim 10, wherein:

the first display parameters comprise a shape, a size, a color, a display position, an initial rotation speed, an initial rotation direction, an initial speed of streaming objects during rotation, and colors of the objects;

the second display parameters comprise a size and a display position of the process wall; and the third display parameters comprise a shape, an initial size, and a color of the second 3D graph.

12. The method as claimed in claim 11, wherein the first display parameters further comprise an association between a manipulated operation speed on the first 3D graph and a rotation speed of the first 3D graph, an association between the rotation speed of the first 3D graph and a stream speed of the objects, and projection paths of the objects.

13. The method as claimed in claim 12, further comprising:
automatically adjusting the rotation speed of the first 3D graph and the stream speed of the objects according to the manipulated operation speed on the first 3D graph.

14. The method as claimed in claim 11, wherein the third display parameters further comprise an association between the size of the second 3D graph and a usage frequency of the second 3D graph.

15. The method as claimed in claim 14, further comprising:
automatically adjusting the size of the second 3D graph according to the usage frequency of the second 3D graph.

16. The method as claimed in claim 11, further comprising:
detecting the current system time of the electronic device from a clock chip of the electronic device.

17. The method as claimed in claim 11, wherein the sizes of the first 3D graph and the process wall, and the display positions of the first 3D graph and the process wall are set according to preset proportions to the size of the display screen of the electronic device.

18. The method as claimed in claim 10, wherein setting the associations between desktop display actions and manipulated operations on the first 3D graph, the process wall, or the second 3D graph comprises:

setting a pause of a user's finger on the first 3D graph beyond a first time period corresponding to an operation of stopping rotation of the first 3D graph;

setting a left-to-right movement of the user's finger on the first 3D graph corresponding to an anti-clockwise rotation of the first 3D graph, and a right-to-left movement of the user's finger on the first 3D graph corresponding to an clockwise rotation of the first 3D graph;

setting a click operation on a black area of the first 3D graph corresponding to a unfolding action of all surfaces of the first 3D graph, a left-to-right movement of the user's finger on an unfolded surface corresponding to an switching operation between the unfolded surfaces, and an upward-to-downward movement of the user's finger on an unfolded surface corresponding to an operation of folding all unfolded surface to resume the first 3D graph;

setting a dragging operation of dragging a second 3D graph from the desktop background to margins of the desktop background corresponding to an operation of deleting the second 3D graph, and a dragging operation of dragging a running process from the desktop background to margins of the desktop background corresponding to an operation of closing the running process; and setting a dragging operation of dragging a running process from the process wall to other position of the desktop background corresponding to an enlarging operation of the running process.

* * * * *